United States Patent
Prasad et al.

(10) Patent No.: US 10,346,321 B2
(45) Date of Patent: Jul. 9, 2019

(54) METHOD TO TRIGGER NVDIMM SAVE FROM REMOTE MANAGEMENT INTERFACE

(71) Applicant: Dell Products L.P., Round Rock, TX (US)

(72) Inventors: Parmeshwr Prasad, Bangalore (IN); Shinose Abdul Rahiman, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 175 days.

(21) Appl. No.: 15/587,048

(22) Filed: May 4, 2017

(65) Prior Publication Data

US 2018/0322076 A1 Nov. 8, 2018

(51) Int. Cl.
*G06F 9/00* (2006.01)
*G06F 13/16* (2006.01)
*G06F 1/26* (2006.01)
*G06F 9/4401* (2018.01)

(52) U.S. Cl.
CPC .......... *G06F 13/1668* (2013.01); *G06F 1/26* (2013.01); *G06F 9/4406* (2013.01)

(58) Field of Classification Search
CPC ....... G06F 13/1668; G06F 1/26; G06F 9/4406
USPC .............. 711/165; 710/301; 713/2; 717/104, 717/120; 709/223, 316, 217
See application file for complete search history.

(56) References Cited

U.S. PATENT DOCUMENTS

| | | | | |
|---|---|---|---|---|
| 7,665,071 | B1* | 2/2010 | Roles | H04L 41/0233 717/104 |
| 2004/0039745 | A1* | 2/2004 | Evans | G06F 16/289 |
| 2004/0158814 | A1* | 8/2004 | Tracey | G06F 9/4488 717/120 |
| 2004/0158838 | A1* | 8/2004 | Tracey | G06F 9/5055 719/316 |
| 2007/0033273 | A1* | 2/2007 | White | G06F 8/30 709/223 |
| 2012/0158890 | A1* | 6/2012 | Jreij | G06F 11/0784 709/217 |
| 2013/0254506 | A1* | 9/2013 | Berke | G06F 11/1658 711/165 |
| 2016/0036628 | A1* | 2/2016 | Gupta | H04W 4/70 455/420 |
| 2016/0118121 | A1* | 4/2016 | Kelly | G06F 13/4068 710/301 |
| 2017/0052716 | A1 | 2/2017 | Jenne et al. | |

(Continued)

*Primary Examiner* — Aurel Prifti
(74) *Attorney, Agent, or Firm* — Jackson Walker L.L.P.

(57) ABSTRACT

A management controller includes a microcontroller and a managed system interface for coupling the management controller to a managed system. The managed system includes a central processing unit (CPU) and a system memory comprised of non-volatile dual in-line memory module (NVDIMM). The management controller is coupled to a management network by an out-of-band interface. The management controller provides a remote management user interface that includes a selectable out-of-band NVDIMM save element. The management controller may establish a connection with an operating system agent and control the agent to perform operations including accessing a memory map to identify an NVDIMM, configuring the NVDIMM in an asynchronous DRAM refresh mode, and triggering an NVDIMM save before toggling CPU reset.

20 Claims, 5 Drawing Sheets

(56) References Cited

U.S. PATENT DOCUMENTS

2017/0161111 A1* 6/2017 Krithivas .............. G06F 9/5072
2017/0235928 A1* 8/2017 Desai .................... G06F 21/105
　　　　　　　　　　　　　　　　　　　　　　713/2
2018/0322016 A1* 11/2018 Debata ................ G06F 11/1441

* cited by examiner

METHOD TO TRIGGER NVDIMM SAVE FROM REMOTE MANAGEMENT INTERFACE

TECHNICAL FIELD

The present disclosure generally relates to management of information handling systems and, more particularly, remote management of information handling systems using out-of-band interfaces.

BACKGROUND

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling system's may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

System memory is an information handling system component that has long been implemented with dynamic random access memory (DRAM) devices. More recently, nonvolatile dual in-line memory modules (NVDIMMs) have been introduced as system memory components. NVDIMMs beneficially integrate nonvolatile structures that preserve data into a traditional DRAM array.

Those who invest in NVDIMM system memory may wish to verify its operation. Enterprise class server systems typically include a baseboard management controller (BMC) or, more simply, a management controller. Baseboard management controllers typically include or support functionality for invoking different power states.

SUMMARY

Disclosed subject matter extends the functionality of an out-of-band (OOB) management interface to support an OOB NVDIMM save operation. When selected, the OOB NVDIMM save operation may register a handler function configured to establish communication with an operating system (OS) agent that triggers the NVDIMM save. The OS agent may access a memory map of the host OS and identify one or more regions of memory associated with one or more NVDIMM devices. The OS agent may locate the one or more NVDIMM devices by identifying regions of the memory map having a persistence attribute. The OS agent may then compare a globally unique identifier (GUID) of the suspected NVDIMM device(s) to confirm to NVDIMM's ID and location. The OS agent may then configure NVDIMM to enter asynchronous DRAM refresh mode before triggering NVDIMM save by issuing an Intelligent Platform Management Interface (IPMI) call. The IPMI call may, for example, assert a save pin of an NVDIMM device. The baseboard management controller may when exit its handler routine and the management controller may then toggle a CPU resent pin. The occurrence of the NVDIMM save may itself be recorded in persistent memory to inform that next operating system instance of the fail write back.

In this manner, disclosed subject matter provides customers with the ability to save NVDIMM contents without interrupting the power supply. In accordance with disclosed subject matter, A management controller includes a microcontroller and a managed system interface. The management system interface may be configured to couple the management controller to a managed system. The managed system may include an information handling system or resource including a central processing unit (CPU) and a system memory, accessible to the CPU, including an NVDIMM. The management controller may further include an OOB interface configured to couple the management controller to a management network.

A computer readable medium of the management controller may include management controller instructions that, when executed, cause the management controller to perform operations that include providing a remote management user interface, including a selectable OOB NVDIMM save element. Responsive to a user input signal indicating selection of the OOB NVDIMM save element, the management controller may perform operations that include establishing a connection with an OS agent and controlling the OS agent to perform OS agent operations. The OA agent operations may include accessing a memory map to identify an NVDIMM, configuring the NVDIMM in an asynchronous DRAM refresh (ADR) mode, and triggering an NVDIMM save before toggling CPU reset.

Triggering NVDIMM save may be performed by issuing an IPMI call to trigger the NVDIMM save. An indication of the NVDIMM save operation in persistent storage for detection during a subsequent boot sequence. The management controller may register an NVDIMM_handler configured to perform said establishing of said connection and said controlling of the OS agent. The management controller may include a virtual console element configured to provide a console user interface. The console user interface may mirror a display device of the managed system, enabling a remotely-located administrator to see, as an example, the boot sequence information displayed on the managed system's display device during a boot sequence. The console user interface may include a plurality of page selection elements including a page selection element corresponding to a power page for controlling power provided to the managed system.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

In the following detailed description of exemplary embodiments, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It is understood that the use of specific component, device, and/or parameter names and/or corresponding acronyms thereof, such as those of the executing utility, logic, and/or firmware (F/W) described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
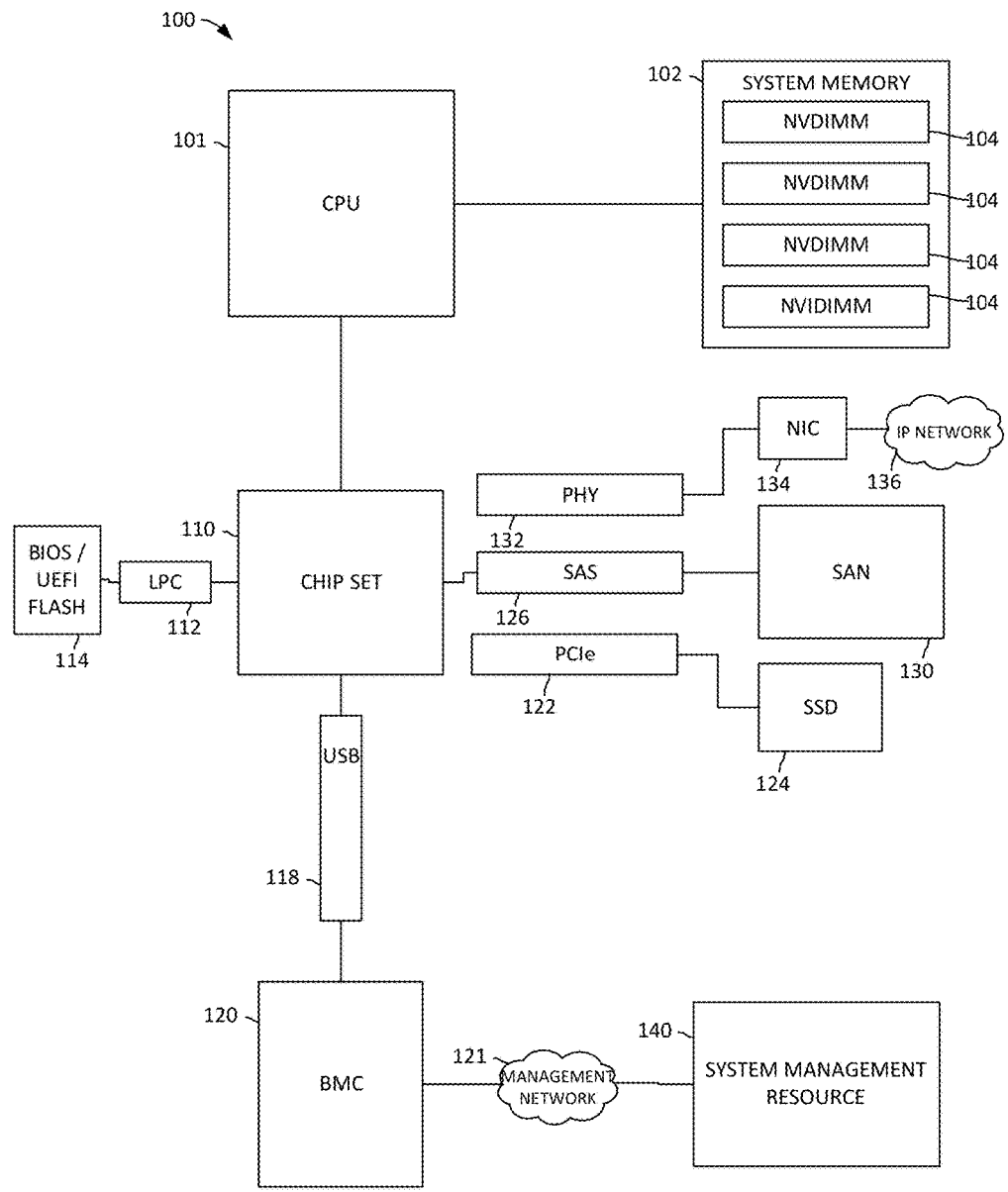
FIG. 1 illustrates a block diagram of an information handling system comprising a managed server in accordance with disclosed subject meter.

Turning now to FIG. 1, and information handling system platform 100 is illustrated. The platform 100 illustrated in FIG. 1 includes a CPU 101, coupled to a system memory 102 comprising one or more NVDIMMs 104. The CPU 101 is further coupled to a chipset 110. The chipset 110 provides various interfaces supporting various input/output (I/O) devices. Although the specific combination of I/O devices and I/O interfaces provided by chipset 110 is an implementation detail, the information handling system 101 illustrated in FIG. 1 includes a low pin count (LPC) interface 112 coupling chipset 110 to a basic I/O system (BIOS) flash 114, a universal serial bus (USB) 118 coupling chipset 110 to BMC 120, a peripheral components interface express (PCIe) interface 122 coupling chipset 110 to any of numerous PCIe/peripheral devices including solid state drive (SSD) 124, a serial attached SCSI (SAS) interface 126 coupling chipset 110 to storage area network (SAN) 130, a physical layer (PHY) transceiver 132 coupling network 136 to chipset 110 via network interface controller (NIC) 134. NIC 134 provides an in-band communication path for CPU 102 to network 136. As described in more detail with respect to FIG. 2A, BMC 120 provides an out-of-band communication path between BMC 120 and an external network identified in FIG. 1 as management network 121 coupled to system management resource 140.

Figure 2A:
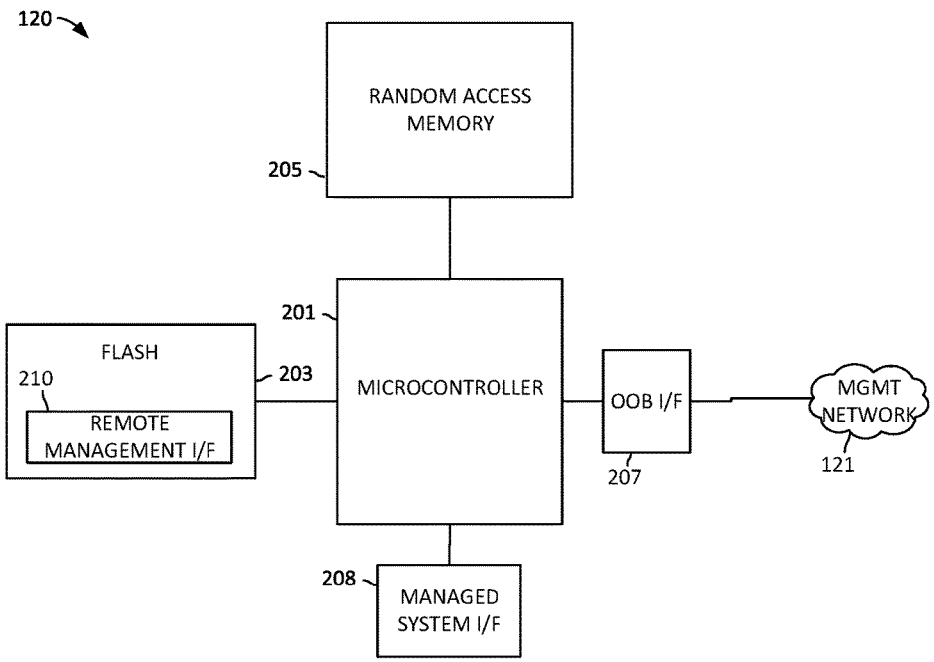
FIG. 2A illustrates a block diagram of a management controller in accordance with disclosed subject matter.

FIG. 2A illustrates selected elements of the BMC 120 illustrated in FIG. 1. The BMC 120 illustrated in FIG. 2A includes a microcontroller 201 coupled to flash storage device 203, random access memory (RAM) 205, OOB interface 207, and a managed system interface 208. The flash storage device 203 illustrated in FIG. 2A includes executable code including executable code for providing an OOB remote management interface 210 as described in more detail in FIG. 2B, FIG. 3, and FIG. 4. The OOB interface 207 provides an interface between BMC 120 and management network 121 or a similar network typically reserved for management traffic. The in band or managed system interface 208 provides an interface between BMC 120 and the information handling system with which BMC 120 is associated.

Figure 2B:
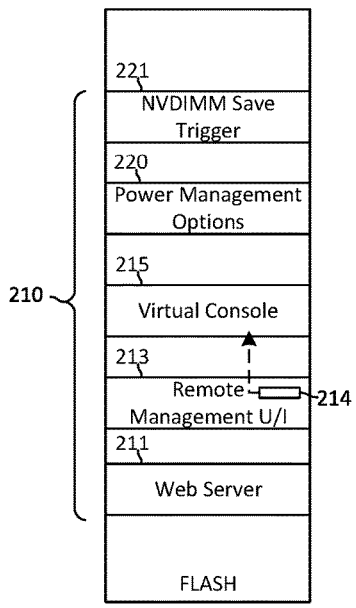
FIG. 2B illustrates a block diagram of software elements of the management controller of FIG. 2A.

Referring now to FIG. 2B, additional detail of the flash storage device 203 of FIG. 2A is illustrated. In particular, additional detail regarding software elements configured to provide remote management interface 210 is illustrated. In at least one embodiment, the remote management interface 210 is implemented as a web server that provides remote management webpages to a remotely located administrator or other user. As illustrated in FIG. 2B, remote management interface 210 includes a web server 211, a remote management user interface 213, a virtual console web page 215, power management options 220, and an OOB NVDIDMM save trigger 221.

Web server 211 may provide the framework for presenting remote management webpages to a remotely located administrative user. Remote management user interface 213 may represent the main page of the remote management interface 210. As depicted in FIG. 2B, remote management user interface 213 includes a selectable element 214 corresponding to a virtual console webpage 215. As further depicted in FIG. 2B, the virtual console 215 includes a selectable power management option element 216 that, when asserted by a user, displays power management options 220. Included in the power management options 220 depicted in FIG. 2B is an NVDIMM save trigger option 221.

In at least one embodiment, the NVDIMM save trigger option 221 initiates an asynchronous save of the contents of system memory 103.

Figure 3:
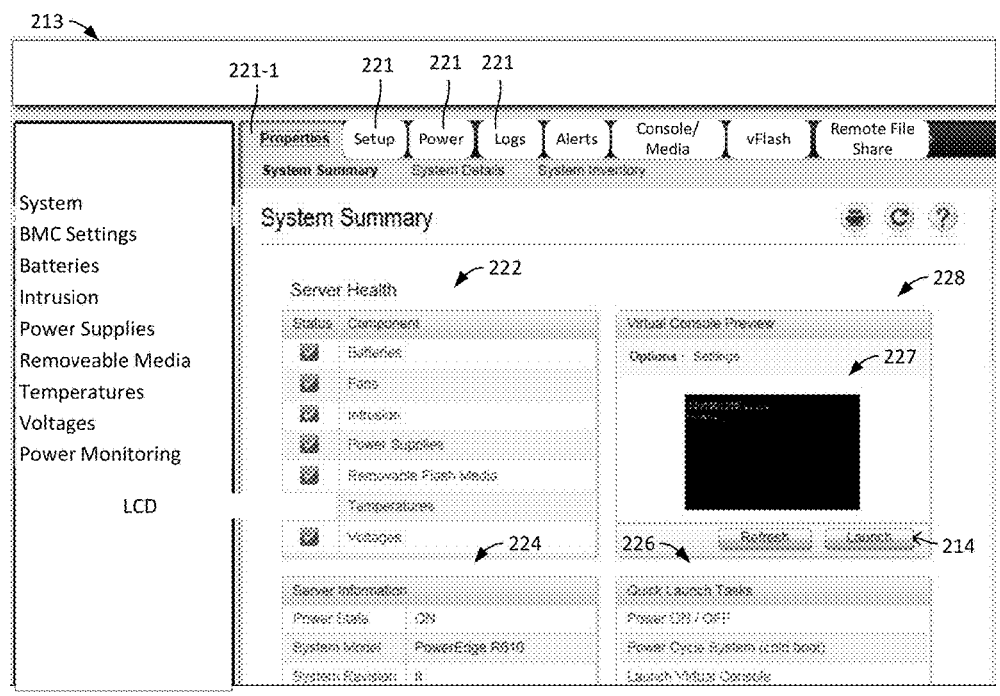
FIG. 3 illustrates a remote management user interface in accordance with disclosed subject matter.

An example remote management user interface 213 is illustrated in FIG. 3. The example remote management user interface 213 illustrated in FIG. 3 includes a plurality of tabs 221 representing various categories of features or functions that remote management user interface 213 supports.

FIG. 3 illustrates a properties tab 221-1 that displays server status in a server status region 222, server identification information in a server information region 224, a collection of frequently invoked tasks in a frequent task region 226, and a virtual console preview 227 in a virtual console region 228. The virtual console preview 227 is configured to display a miniaturized version of the managed system's display device. If, as an example, the managed system's display device is displaying a boot sequence screen, the virtual console preview 227 is configured to display a miniaturized version of the display screen.

In addition, the remote management user interface 213 illustrated in FIG. 3 includes a selectable launch element 214 positioned underlying the virtual console region 228. The launch element 214, when asserted by the administrator, launches a virtual console screen 215 illustrated in FIG. 4.

Figure 4:
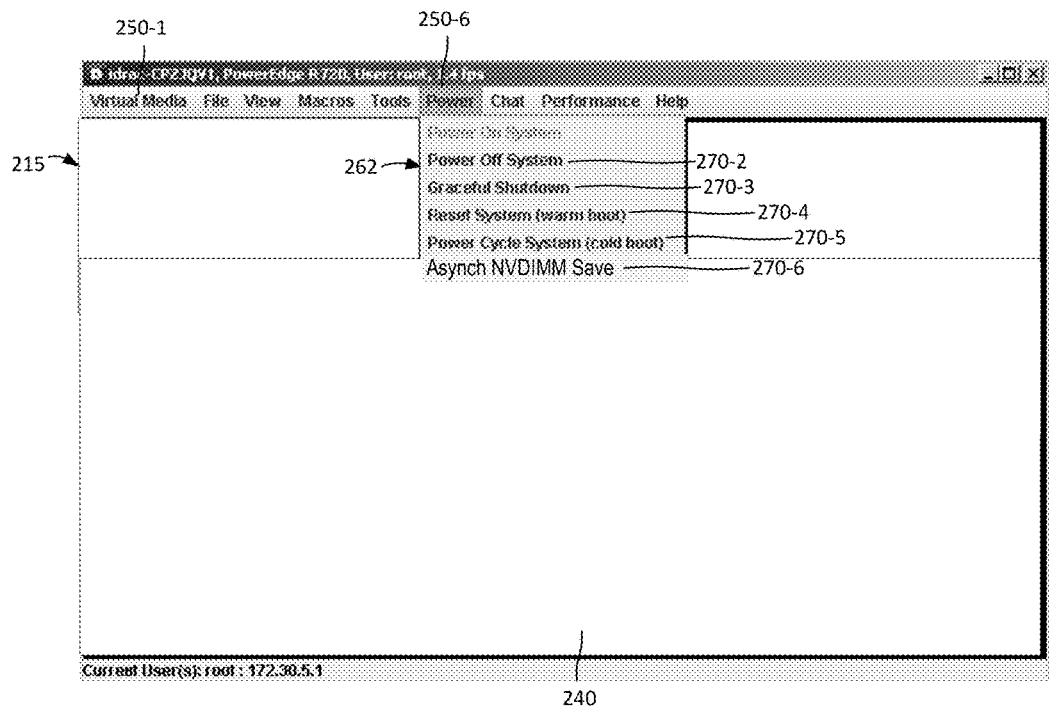
FIG. 4 illustrates a virtual console interface.

The virtual console interface 215 illustrated in FIG. 4 is substantially comprised of a display region 240 and a task bar menu 242 positioned above the display region 240. The display region 240 is configured to reproduce the display screen of the managed system. The taskbar 241 of the virtual console 215 includes a number of virtual Console options 250-1 through 250-n. The virtual console options 250 represent different features that the virtual console supports. Included in the virtual console options illustrated in FIG. 4, is a power management option 250-6. FIG. 4 illustrates an instance where the power management option 250-6 has been asserted by the remotely located administrator such that a drop-down menu 262 appears. The drop-down menu 262 illustrated in FIG. 4 includes various power control options 270-1 through 270-6. as shown in FIG. 4, the power control options 270 include a power off system option 270-2, a graceful shutdown option 270-3, a reset system or "warm boot" option 270-4, and a power cycle system or "cold boot" option 270-5. In addition, the power control options 270 illustrated in FIG. 4 include a NVDIMM trigger option 270-6 that is configured to trigger a save of the system memory contents to its non-volatile resource to simulate conditions that may be present should a power outage occur.

Figure 5:
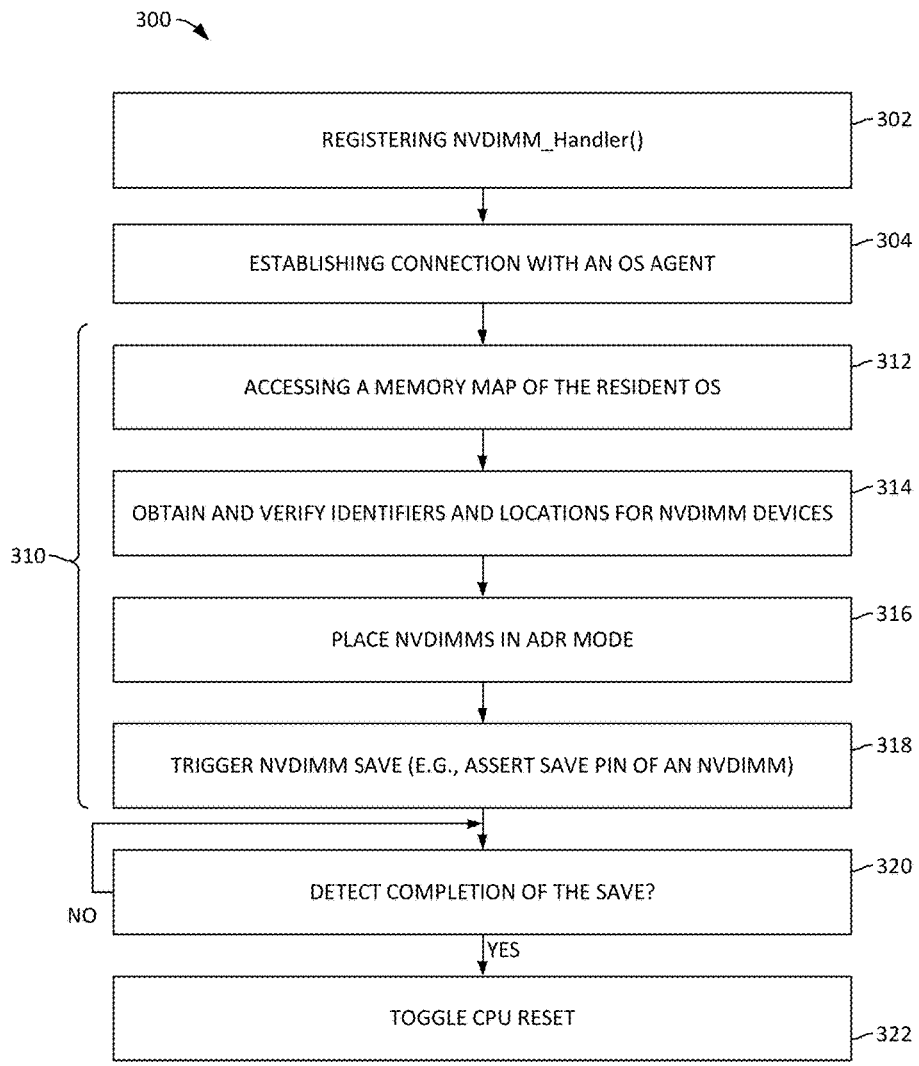
FIG. 5 illustrates a flow diagram of a method for triggering an NVDIMM save from an OOB remote management interface.

FIG. 5 illustrates a flow diagram of an OOB NVDIMM save operation 300 that may be performed when the NVDIMM trigger option 270-6 illustrated in FIG. 4 is selected. The NVDIMM save operation 300 illustrated in FIG. 5 begins when the OOB NVDIMM save option is selected. The OOB NVDIMM save save operation 300 of FIG. 5 responds by registering (operation 302) a handler function referred to in FIG. 5 as NVDIMM handler function 303. The NVDIMM handler function 309 establishes (operation 304) a connection with an OS agent.

As illustrated in FIG. 3, the OS agent, when executed, performs a sequence of OS agent operations collectively identified in FIG. 3 as agent operations 310.

The OS agent operations 310 illustrated in FIG. 5 include accessing or obtaining (operation 312) a memory map from the managed system operating system. After obtaining the memory map, the OS agent obtains (operation 314) GUID and location information for the NVDIMM devices. The OS agent may identify NVDIMM devices based on attribute information, such as attribute information obtained from the memory map indicating persistent storage devices. Upon verifying GUID and location information for a persistent storage device suspected of being one of the NVDIMM devices, the OS agent then transitions (operation 316) the NVDIMMs to an ADR mode during which storage is preserved indefinitely. To trigger an NVDIMM save, the OS agent may then perform (operation 318) an NVDIMM save command to assert a save pin on an NVDIMM device, via an IPMI call or another suitable management standard.

Following the triggering of a the NVDIMM save operation, the illustrated method may then await (operation 320) a notification from the NVDIMM that the save has complemented before toggling (operation 322) a CPU RESET pin.

Any one or more processes or methods described above, including processes and methods associated with any flow diagrams, may be embodied as a computer readable storage medium or, more simply, a computer readable medium including processor-executable program instructions, also referred to as program code or software, that, when executed by the processor, cause the processor to perform or otherwise results in the performance of the applicable operations.

A computer readable medium, which may also be referred to as computer readable memory or computer readable storage, encompasses volatile and non-volatile medium, memory, and storage, whether programmable or not, whether randomly accessible or not, and whether implemented in a semiconductor, ferro-magnetic, optical, organic, or other suitable medium. Information handling systems may include two or more different types of computer readable medium and, in such systems, program code may be stored, in whole or in part, in two or more different types of computer readable medium.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, F/W, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicates the presence of stated features, operations, elements, and/or components, but does not preclude the presence or addition of one or more other features, operations, elements, components, and/or groups thereof.

What is claimed is:

1. A management controller, comprising:
a microcontroller;
a managed system interface, configured to couple the management controller to a managed system, wherein the managed system comprises an information handling system including a central processing unit (CPU) and a system memory, accessible to the CPU, including a non-volatile dual in-line memory module (NVDIMM);
an out-of-band interface configured to couple the management controller to a management network; and
a non-transitory computer readable medium, including management controller instructions that, when executed, cause the management controller to perform operations comprising:
providing a remote management user interface, including a selectable out-of-band NVDIMM save element;
responsive to a user input signal indicating selection of the out-of-band NVDIMM save element, performing management controller operations comprising:
establishing a connection with an operating system (OS) agent; and
controlling the OS agent to perform OS agent operations comprising:
accessing a memory map to identify an NVDIMM;
configuring the NVDIMM in an asynchronous dynamic random access memory refresh mode; and
triggering an NVDIMM save; and
toggling CPU reset.

2. The management controller of claim 1, wherein triggering the NVDIMM save comprises asserting a Save pin of an NVDIMM device via an Intelligent Platform Management Interface (IPMI) call.

3. The management controller of claim 1, further comprising:
storing an indication of the NVDIMM save operation in persistent storage for detection during a subsequent boot sequence.

4. The management controller of claim 1 wherein the management controller operations comprise:
registering an NVDIMM_handler configured to perform said establishing of said connection and said controlling of the OS agent.

5. The management controller of claim 4, wherein the remote management user interface includes a virtual console element configured to provide a console user interface, indicative of a display device of the managed system, to a remotely located administrator.

6. The management controller of claim 5, wherein the console user interface includes a plurality of page selection elements including a page selection element corresponding to a power page for controlling power provided to the managed system.

7. The management controller of claim 1, wherein providing a remote management user interface, comprising providing the remote management user interface via the out-of-band interface.

8. An information handling system management method, comprising:
providing a remote management user interface, including a selectable out-of-band NVDIMM save element;
responsive to a user input signal indicating selection of the out-of-band NVDIMM save element, performing management controller operations comprising:
establishing a connection with an operating system (OS) agent; and
controlling the OS agent to perform OS agent operations comprising:
accessing a memory map to identify an NVDIMM;
configuring the NVDIMM in an asynchronous dynamic random access memory refresh mode; and
triggering an NVDIMM save; and
toggling CPU reset.

9. The method of claim 8, wherein triggering the NVDIMM save comprises asserting an NVDIMM save pin of the NVDIMM device via an Intelligent Platform Management Interface call.

10. The method of claim 8, wherein the operations include:
storing an indication of the NVDIMM save operation in persistent storage for detection during a subsequent boot sequence.

11. The method of claim 8, wherein the management controller operations comprise:
registering an NVDIMM_handler configured to perform said establishing of said connection and said controlling of the OS agent.

12. The method of claim 11, wherein the remote management user interface includes a virtual console element configured to provide a console user interface, indicative of a display device of the managed system, to a remotely located administrator.

13. The method of claim 12, wherein the console user interface includes a plurality of page selection elements including a page selection element corresponding to a power page for controlling power provided to the managed system.

14. The method of claim 8, wherein providing a remote management user interface, comprising providing the remote management user interface via the out-of-band interface.

15. An information handling system comprising:
a central processing unit;
system memory, including a non-volatile dual in line memory module management controller, comprising: and
a baseboard management controller comprising:
a microcontroller;
a managed system interface, configured to couple to the central processing unit;
management controller to a managed system, wherein the managed system comprises an information handling system including a central processing unit (CPU) and a system memory, accessible to the CPU, including a non-volatile dual in-line memory module (NVDIMM);
an out-of-band interface configured to couple the management controller to a management network; and
a non-transitory computer readable medium, including management controller instructions that, when executed, cause the management controller to perform operations comprising:
providing a remote management user interface, including a selectable out-of band NVDIMM save element;

responsive to a user input signal indicating selection of the out-of band NVDIMM save element, performing management controller operations comprising:
  establishing a connection with an operating system (OS) agent; and
  controlling the OS agent to perform OS agent operations comprising:
    accessing a memory map to identify an NVDIMM;
    configuring the NVDIMM in an asynchronous dynamic random access memory refresh mode;
    triggering an NVDIMM save; and
    toggling CPU reset.

16. The information handling system of claim 15, wherein triggering the NVDIMM save comprises issuing an Intelligent Platform Management Interface call to assert a save pin of the NVDIMM.

17. The information handling system of claim 15, further comprising:
storing an indication of the NVDIMM save operation in persistent storage for detection during a subsequent boot sequence.

18. The information handling system of claim 15 wherein the management controller operations comprise:
registering an NVDIMM handler configured to perform said establishing of said connection and said controlling of the OS agent.

19. The information handling system of claim 18, wherein the remote management user interface includes a virtual console element configured to provide a console user interface, indicative of a display device of the managed system, to a remotely located administrator.

20. The information handling system of claim 19, wherein the console user interface includes a plurality of page selection elements including a page selection element corresponding to a power page for controlling power provided to the managed system.

* * * * *